United States Patent [19]

Ebert

[11] 4,189,630
[45] Feb. 19, 1980

[54] METHOD OF HEATING DEFORMABLE ARTICLES ON A SUPPORT OF VERTICLE FIBERS

[76] Inventor: Edward A. Ebert, 203 Huxley Dr., Snyder, N.Y. 14226

[21] Appl. No.: 908,207

[22] Filed: May 22, 1978

Related U.S. Application Data

[62] Division of Ser. No. 752,609, Dec. 20, 1976, Pat. No. 4,104,508.

[51] Int. Cl.² .............................................. H05B 1/00
[52] U.S. Cl. ...................................... 219/354; 81/3.5; 34/4; 219/405; 219/521; 219/553; 219/460; 219/464
[58] Field of Search ............... 219/460, 521, 354, 405, 219/85 BA, 85 BH, 349; 34/4; 350/96.24, 188.9; 248/350, 346; 351/178; 81/3.5

[56] References Cited

U.S. PATENT DOCUMENTS

| | | | |
|---|---|---|---|
| 2,466,085 | 4/1949 | Dowrelio | 219/460 |
| 3,315,680 | 4/1967 | Silbertrust et al. | 350/96.24 |
| 3,333,805 | 8/1967 | Marshall | 248/350 |
| 3,529,117 | 9/1976 | Costello | 219/85 BA |
| 3,781,439 | 2/1957 | Lane | 219/521 |
| 3,816,705 | 6/1974 | Ebert | 219/521 |
| 4,001,047 | 1/1977 | Boah | 219/354 |

FOREIGN PATENT DOCUMENTS 2509465 9/1976 Fed. Rep. of Germany ........... 248/350

*Primary Examiner*—Bruce A. Reynolds
*Assistant Examiner*—Bernard Roskoski

[57] ABSTRACT

A soft non-marring carpet type support for articles while being heated into a softened condition consisting of either an intermittent or a continuous line of fine fiberglass fibers to accommodate either a flat or uneven surface in contact with the flexible tips, the support being so gentle and so distributed so as not to leave any impression on the articles softened surface. The support transmits a minimum of heat or cold by conduction, is transparent to infrared radiation across its thickness and also at the same time transmits infrared radiation through the length of its optical fibers.

4 Claims, 12 Drawing Figures

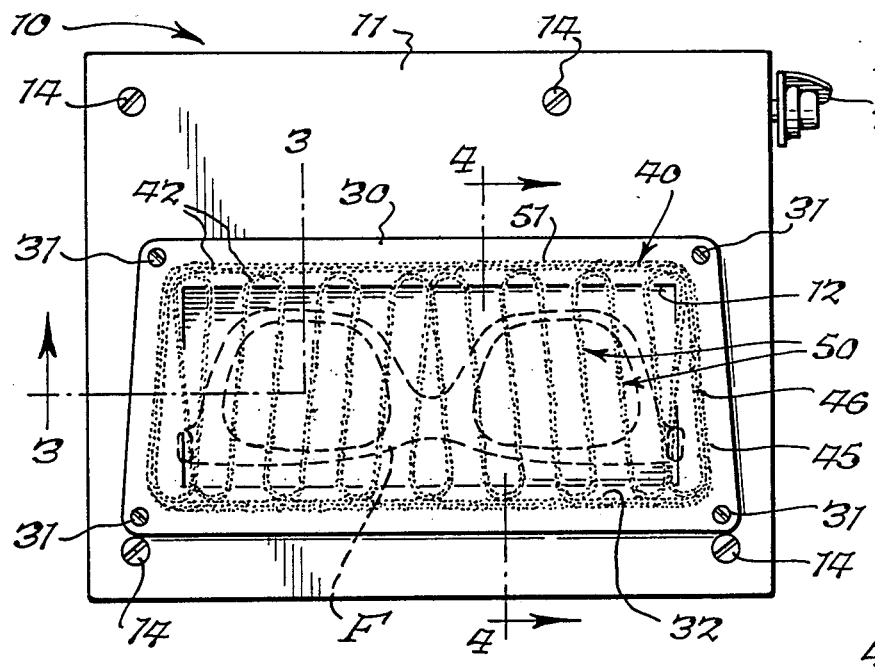
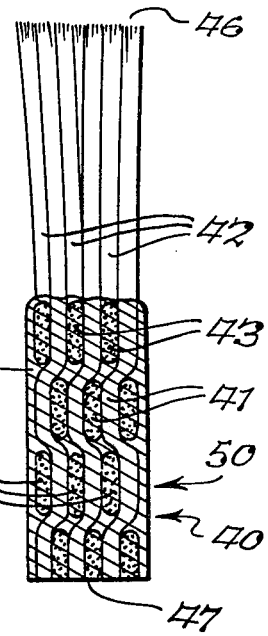
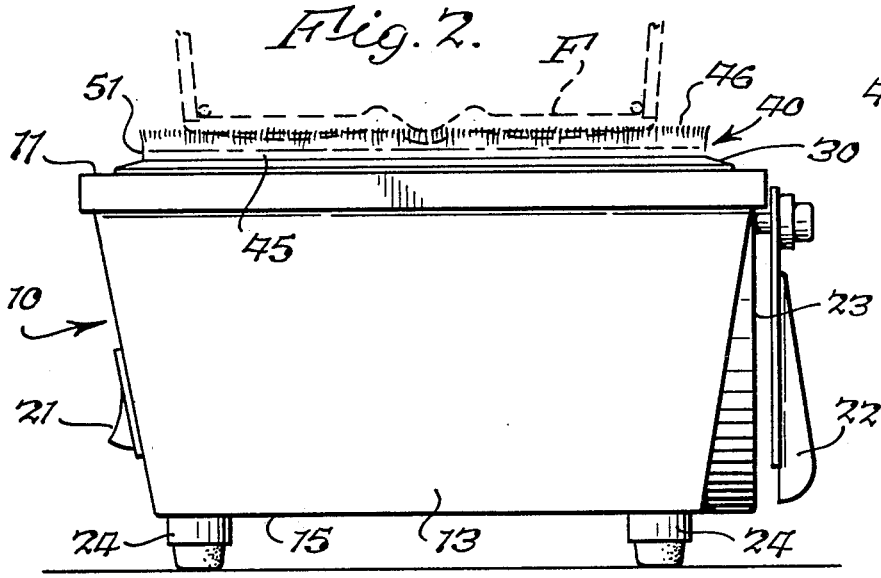
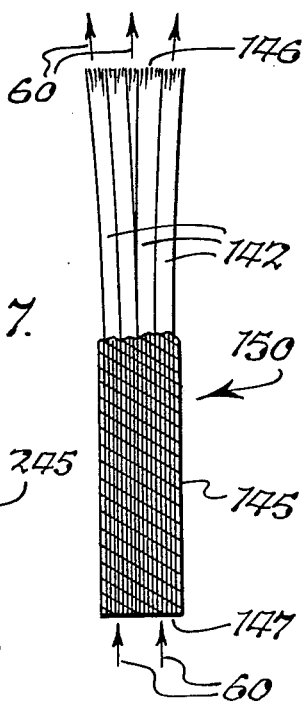
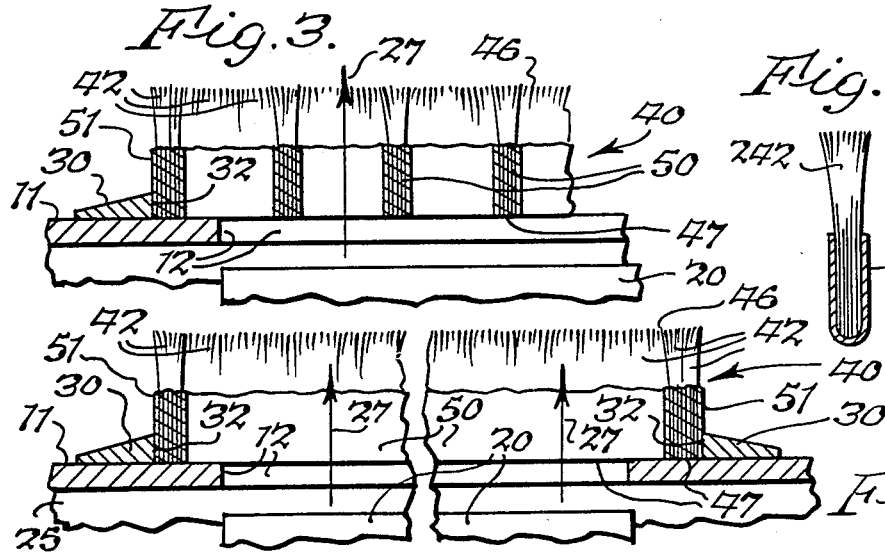

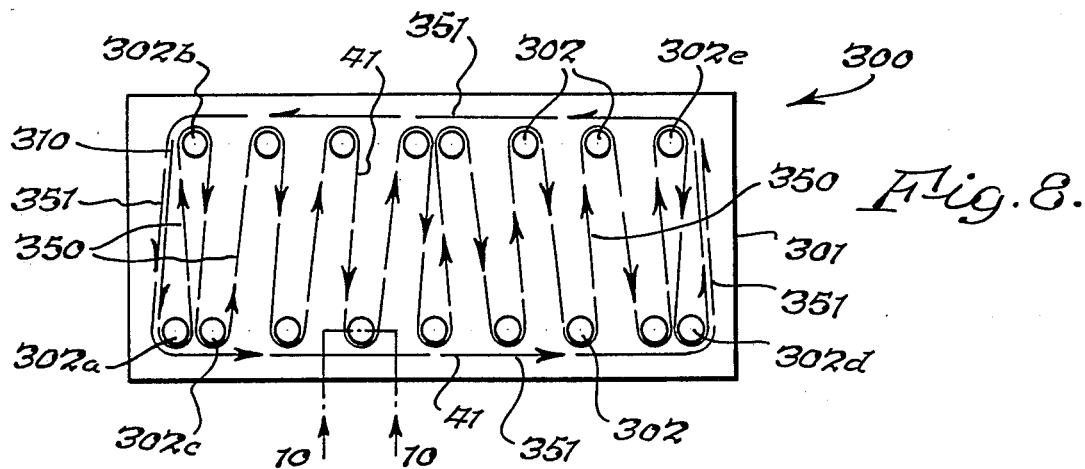
Fig. 8.
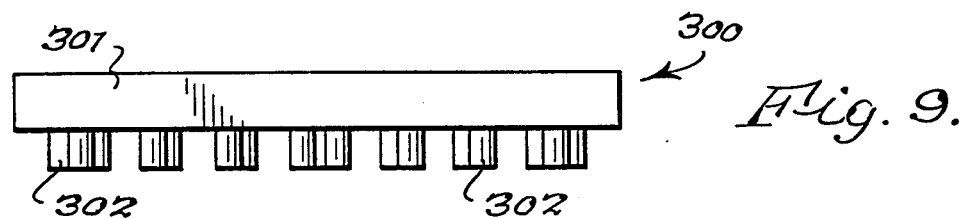
Fig. 9.
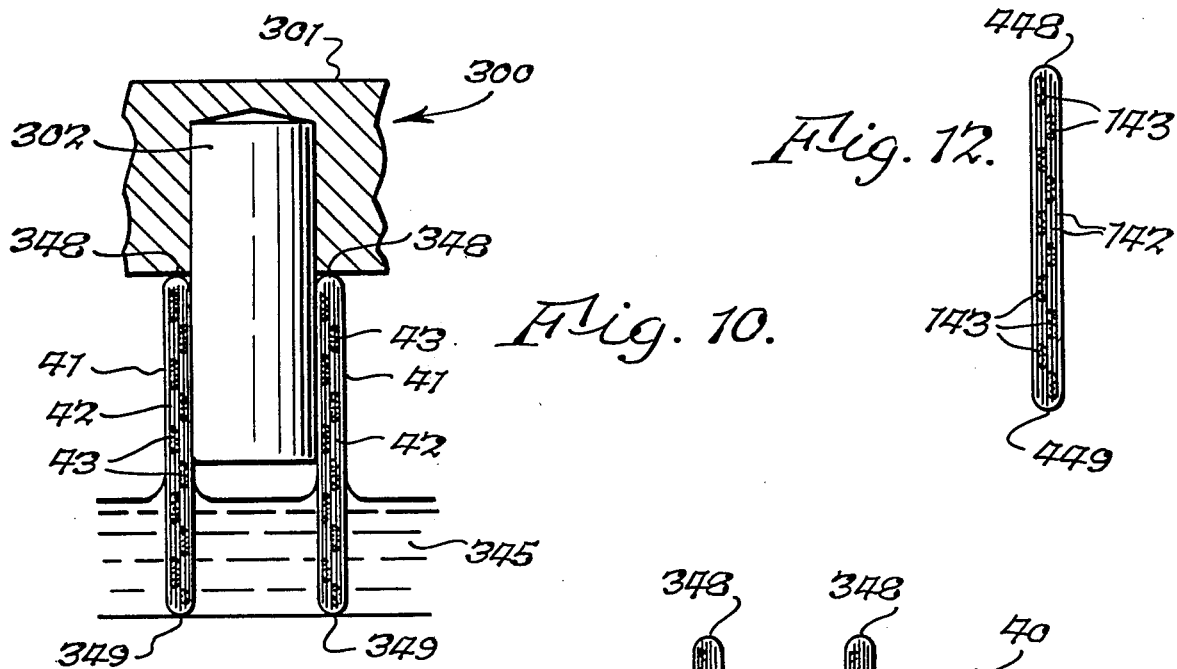
Fig. 10.
Fig. 12.
Fig. 11.

METHOD OF HEATING DEFORMABLE ARTICLES ON A SUPPORT OF VERTICLE FIBERS

This is a division of application Ser. No. 752,609 filed on Dec. 20, 1976, now U.S. Pat. No. 4,104,508.

BACKGROUND OF THE INVENTION

This invention relates to apparatus and a method for supporting, without marring an article such as an opthalmic frame, which softens while being heated and which is subject to being marred while being heated.

The heating device this subject matter is concerned with, is radiant type heating or convectional hot air heating or both.

Particularly in radiant type heating are we concerned with the distance the object or article is from the radiation source. Since the temperature varies inversely to the square of the distance we want to be at a certain place relatively to the infrared generator so as not to be too cool or get too hot. Too close might mean scorching at a certain temperature setting of the machine while too far away would mean slower heating. Small variations in position when heating by convection makes little temperature difference and is not critical.

In radiant heating to keep the article close also means that physical contact with the heater parts is likely. This can mean heat dents, scratching and marring of the article, thus damaging it to some degree. The operator then tends to keep the article too far away or he sets the machine to a low setting thus taking longer to heat and at times underheating the article.

The present invention can accomplish the close positioning of the article to the radiator in the heater and at the same time eliminate any marring or damage to the article.

A prime object is to support a heat softened article while being exposed to heat without deformation or marring of its surface.

Another object is to provide tens of thousands of upwardly projecting but resilient filaments in carpet like arrangement which individually in supporting never press upwardly hard enough to impress their shape into the soft article and yet in their multitude effort are able to support the whole article.

Another important object is to provide a support which is transparent to infrared rays to allow their transmission past and through the support to the article.

Still another object is to take advantage of the phenomenon of fiber optics to transmit infrared rays to the article being supported through the carpet itself.

A further object is to provide a grid structure which allows free flow of air while serving as a support.

Another object is to support an article at a fixed distance from its radiant heat source to establish uniformity of heating of subsequent articles placed there, with the machine heating at a particular heat setting.

SUMMARY

This invention relates to carpet supports for articles composed of heat softening material whose surfaces are easily subject to deformation or other deleterious effects by reason of the weight of the article bearing down upon the supports when the article reaches its softening temperature. Fine filaments of glass fibers, vertically set, on end, in line with the direction of radiation and air flow serve to support an article set upon them. These pliant upstanding fibers in great multitude adapt to whatever conformity is needed to bear the object or article, each bearing upwardly with a pressure insufficient to indent its own form into the soft surface of the article while at the same time being greatly transparent to infrared rays but also transmitting the infrared rays from their bottom end to their top end, to the article by fiber optics effect.

BRIEF DESCRIPTION OF THE DRAWINGS

FIG. 1 is a top plan of an article heater showing a pair of eyeglass frames in dotted lines, being heated.

FIG. 2 is a front elevation of FIG. 1.

FIG. 3 is a vertical sectional view taken along line 3—3 in FIG. 1.

FIG. 4 is another vertical sectional view taken at 90° to FIG. 3 along line 4—4 in FIG. 1.

FIG. 5 is a greatly enlarged fragmentary section of the article support similar to FIG. 3.

FIG. 6 is a fragmentary vertical cross section of a modified form of the invention.

FIG. 7 is a vertical section of another modified form.

FIG. 8 is a plan view of a form jig.

FIG. 9 is a side elevation of FIG. 8.

FIG. 10 is a vertical section on line 10—10 of FIG. 8.

FIG. 11 is a vertical section of impregnated tapes.

FIG. 12 is another vertical section of a tape.

DETAILED DESCRIPTION

A heater housing 10 is shown in FIGS. 1 and 2 as having a flat top 11 provided with an opening 12 and is fastened upon a heater housing 13 by screws 14.

The housing contains regulated heating means 20 which may be electrical or otherwise, operable through a switch 21 to turn it on or off and controlled in temperature by a setting lever 22 rotatable over a dial 23 to read the setting.

Legs 24 lift the housing 10 above the surface it is placed upon for entrance of air into the housing interior 25 through an opening (not shown) in its bottom 15. Air pressurizing means (not shown) is provided in the housing to cause an out flow of heated air past and through the heating means 20. The arrows 27 indicate this out flow of heated air as shown in FIGS. 3 and 4 as well as the direction of infrared radiation, which may be supplied by the heating means 20. The heater and housing may be of hot air type shown in U.S. Pat. No. 2,789,200 or of the radiant type shown in U.S. Pat. No. 3,816,705.

A frame member 30 is held to the top 11 by screws 31 and has an opening 32 which is larger than the opening 12 in the top 11. This frame member 30 provides a holding means for a grid carpet generally indicated at 40.

The grid 40 is the foundation for the subject matter of this application and in this form comprises a glass fiber fabric 41 having the usual woof yarns 42 interwoven with the warp yarns 43. The lower portion as seen in FIG. 5 has the woof and warp yarns impregnated with a thermosetting or other suitable resin or cementitious binder 45 thus fixing this lower portion in a rigid monolithic structure. The upper warp yarns 43 are removed as seen in FIG. 5 to provide the woof yarns 42 with an individual freedom characteristic of the hairs of a tuft of a camel hair brush and is indicated as 46.

Since an individual glass fiber has an outside diameter of about 0.0005" (five ten thousandths of an inch) it has great tensile strength, resiliency, great softness and is a carrier of infrared radiation.

A successful carpet support illustrated and described herewith was made, starting with a two inch wide fiberglass tape doubled upon itself to be one inch wide. The warp yarns numbered eighteen to the inch while the woof yarns numbered thirty four to the inch. Each of the warp and woof strands were comprised of three twisted threads and each thread was comprised of approximately one hundred fifty continuous monofilaments, thus giving each strand about four hundred fifty individual fibers five ten thousandths of an inch in diameter.

After manufacture and assembly into the grid 40 the rigid bound portion equalled three eights of an inch high and the tuft portion equalled three eights of an inch, giving a total of three quarters of an inch finished height. In making such a carpet support the density or number of vertically disposed fibers per square inch determine its support capability, thus it can be designed for supporting heavier or lighter articles.

As seen in FIG. 1 this grid 40 is the form of many lateral bars 50 across the narrow span of the frame 30 and opening 12. These bars 50 meet and join at their ends to a perimeter band 51 totally surrounding all of the bar ends. A cross section through the perimeter band would look just like that in FIG. 5.

FIG. 3 shows the perimeter band 51 fitting inside the opening 32 of the frame member 30 while the bars 50 cross over and span the opening 12 in the top 11 of the housing 10. In FIG. 4 it is clearly seen how a lateral bar 50 spans across the opening 12. These bars 50 provide the rigid support necessary to carry an opthalmic frame F shown in dotted lines in FIG. 1 and FIG. 2.

The grid 40 is fitted into the opening 32 of the frame 30 in any suitable way, is possibly cemented in place or the frame 30 might be molded around and with the grid 40.

It will be seen in FIG. 1 that the frame assembly 30 with grid 40 with the bars 50 and perimeter 51 are held in place by the screws 31.

The manner in which the just described grid was made will now be described.

METHOD OF MANUFACTURE

In FIG. 8 can be seen a form jig 300 which essentially comprises a base 301 and a plurality of dowels or pegs 302. These dowels might be placed in various locations and spacing other than those shown to get many other contours or grid configurations.

Shown in FIGS. 8 and 10 are a tape 41 wound about the jig 300 in the following manner. Starting at 310 the tape 41 is wound downwardly and around the lowermost dowel 302a and up and around dowel 302b, then down to 302c around and up and down over the pegs 302 as the dotted, arrowed, lines 350 illustrate until the dowel 302d in the lower right hand corner is reached. The tape 41 is then wrapped up and around dowel 302e and then over to the left, around dowel 302b and down to 302a, then over to the right to dowel 302d and then up to 302e where it is fastened to hold its end in place.

In FIG. 8 the up and down lines 350 would represent the lateral bars 50 while the dotted lines 351 represent the perimeter band 51 previously described.

The windings may be made of tapes of heavy or light, double or single, whatever density is required to support these particular articles, the carpet is to be used for.

The completely wound tape 41 on the form 300 is now inverted and dipped, as shown in FIG. 10 into an impregnating and hardening liquid 345. Of course instead of being dipped the liquid 345 could be painted on. This liquid may be an epoxy resin, other thermosetting compound or other cementitious material which will impregnate the fibers to bind them together mechanically. The form 300 with the wound and impregnated tape 41 is now removed from the liquid and the cement is allowed to harden or set. A rigid grid 40 has now been formed and it can be removed from the form 300 because it now is self supporting.

A cross section of a portion of the grid 40 is shown in FIG. 11 and would be typical of the locale of the section line 10—10 in FIG. 8. A section through the perimeter 51 and a looped portion of one of the bars 50 would look like FIG. 4, the loop portion now being joined to the perimeter 51 by the cement to make all of the runs 50 and 51 integral.

The lower edges 349, FIG. 11, of the gird 40 are next ground off and polished to form the optically receptive faces 47, shown in FIG. 5 and the upper ends of the woof strands 42 are cut at 348, FIG. 11, to form the upper terminal ends 46, in FIG. 5. These ends 46 may be trimmed flush with each other or may be cut to give a textured surface.

Upper warp strands 43 are now stripped off from their inter-weaving with the woof strands 43, down to the upper limit of the cemented and impregnated portion 45, FIG. 5.

Since the lower ends of all of the individual fibers are ground and polished they are now receptive to receiving of infrared radiation from the heating means 20 and will readily transmit these rays to their upper tips 46 contacting the article such as the frames F to deliver the energy rays to the article by the principles of fiber optics.

The arrows 60 in FIG. 6 indicate the entrance and exit of rays transmitted through the fibers 42 and 142.

A modified form of the invention is disclosed in FIG. 6 wherein the vertical fiber strands 142 are set on end and then have their lower ends impregnated with a suitable binding agent 145 such as an epoxy resin and with a slight change in procedure the just described steps of manufacture are used to make this form of the invention. Again a form jig 300 and a woven tape 41 are used. The tape 41 is wound on the jig as previously described to form the runs 350, 351 in FIG. 8 with the tape end then fastened in place. The extending edges 349 of the tape are cut at the selvage through the bends of the woof strands 142 at 449, FIG. 12. Several weaves of warp strands 143 are then stripped off to expose the woof strands 142 alone. This stripped portion is then impregnated with a hardening cement and left until hardened. Again an integral grid 40 has been made, the bars 50 being integral with the perimeter 51. The upper selvage bends of the woof strands 142 are now cut and the warp strands 143, see FIG. 12, that remain are removed to leave just woof strands 142 bound together at 145 and as shown in FIG. 6. The bottom 147 is then ground and polished and the top 146 may be trimmed or textured. Thus the warp strands 143 that are removed completely have served to position and hold the woof strands 142 in position until formed as described in the grid 40.

Another modified form is illustrated in FIG. 7 wherein the vertically disposed strands 242 are gripped in a channel member 245 which is then fabricated into a suitable grid.

From the foregoing it can be realized that even with careless handling of an article on the carpet support, the article will not be marred. Also, that it is now possible to lay the article on the carpet while being heated instead of hand holding it and that the article will not be harmed even when softened. This carpet will also aid in heating the article since it is transparent to the infrared rays, even transmits the rays and allows for convectional air heating at the same time.

Also it has been demonstrated in what manner a carpet of this type and use can be easily and economically produced and varied in texture to be adapted to fit a product need.

The terms and expressions which have been employed are used as terms of description and not of limitation, and there is no intention, in that use of such terms and expressions of excluding any equivalents of the features shown and described, or portions thereof, it being recognized that various modifications are possible within the scope of the invention claimed.

What is claimed is:

1. The method of heating an article by infrared radiation without harm to or any marring of the surface of said article comprising the steps of;
   supporting said article on the upper resilient tip ends of a myriad of vertically disposed tufts of heat resistant fibers bonded together at their lower tip ends into a rigid support;
   passing said radiation upwardly alongside of said fibers as well as;
   transmitting infrared rays internally through said fibers from their said lower tip ends to their said upper tip ends and to said article.

2. The method of heating an article by infrared radiation without harm to or any marring of the surface of said article comprising the steps of;
   supporting said article on the upper resilient tip ends of a myriad of vertically disposed tufts of heat resistant fibers bonded together at their lower tip ends into a rigid support;
   passing said radiation upwardly alongside of said fibers to said article and;
   wherein said fibers and said bonding are comprised of material transparent to said infrared radiation.

3. The method according to claim 1 further comprising, the addition of a flow of convectional air along with said infrared radiation to said article.

4. The method according to claim 2 further comprising, the addition of a flow of convectional air along with said infrared radiation to said article.

* * * * *